(12) United States Patent
Kubota

(10) Patent No.: US 7,619,681 B2
(45) Date of Patent: Nov. 17, 2009

(54) IMAGE-CAPTURING DEVICE THAT, WHEN IT IS DETERMINED THAT A CONTROL VALUE OF AN EXPOSURE-CONTROL EXCEEDS A CORRESPONDING PREDETERMINED VALUE, ADJUSTS THE CONTROL VALUE TO A VALUE NOT EXCEEDING THE CORRESPONDING PREDETERMINED VALUE, THEN SETS THE CONTROL VALUE AGAIN BASED ON THE RESULT OF COMPARING LUMINANCE DATA OBTAINED AFTER AN ADJUSTMENT AND A PREDETERMINED TARGET LUMINANCE VALUE, AND METHOD FOR CONTROLLING SAME

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 11/282,430

(22) Filed: Nov. 18, 2005

(65) Prior Publication Data
US 2006/0125952 A1 Jun. 15, 2006

(30) Foreign Application Priority Data
Dec. 10, 2004 (JP) ............................. 2004-358359

(51) Int. Cl.
*H04N 5/235* (2006.01)

(52) U.S. Cl. ..................................... 348/362; 348/230.1
(58) Field of Classification Search .............. 348/229.1, 348/230.1, 362–365
See application file for complete search history.

(56) References Cited

U.S. PATENT DOCUMENTS

| | | | | |
|---|---|---|---|---|
| 5,473,374 A | * | 12/1995 | Shimizu et al. | ............. 348/363 |
| 2002/0080247 A1 | * | 6/2002 | Takahashi et al. | ........... 348/229 |
| 2006/0087581 A1 | * | 4/2006 | Lin | ............................. 348/364 |

FOREIGN PATENT DOCUMENTS

| | | |
|---|---|---|
| JP | 2003-244537 A | 8/2003 |
| JP | 2004-304252 A | 10/2004 |
| JP | 2003-153073 A | 5/2005 |

* cited by examiner

*Primary Examiner*—Timothy J Henn
(74) *Attorney, Agent, or Firm*—Canon U.S.A., Inc. I.P. Division

(57) ABSTRACT

At least one exemplary embodiment is directed to an image-capturing device which can include an imaging unit that performs photoelectric conversion on incident light that is formed on an imaging screen, a luminance-data extracting unit that extracts luminance data from data read from the imaging unit, and an exposure-adjusting unit that sets and controls an exposure value on the basis of set control values, corresponding to the result of comparing the luminance data with predetermined target luminance values.

6 Claims, 6 Drawing Sheets

IMAGE-CAPTURING DEVICE THAT, WHEN IT IS DETERMINED THAT A CONTROL VALUE OF AN EXPOSURE-CONTROL EXCEEDS A CORRESPONDING PREDETERMINED VALUE, ADJUSTS THE CONTROL VALUE TO A VALUE NOT EXCEEDING THE CORRESPONDING PREDETERMINED VALUE, THEN SETS THE CONTROL VALUE AGAIN BASED ON THE RESULT OF COMPARING LUMINANCE DATA OBTAINED AFTER AN ADJUSTMENT AND A PREDETERMINED TARGET LUMINANCE VALUE, AND METHOD FOR CONTROLLING SAME

BACKGROUND OF THE INVENTION

1. Field of the Invention

The present invention relates to a method for exposure of an image captured by an image-capturing device.

2. Description of the Related Art

Image-capturing devices, for example, video cameras, digital still cameras, and cellular phones equipped with cameras, perform image processing on image data photoelectrically converted by image pickup elements, for example, charge coupled devices (CCDs) and complementary metal-oxide semiconductor (CMOS) sensors, and display images on display units, such as liquid crystal displays (LCDs) or store the processed image data on storage media, for example, flash memories and magnetic tapes.

In this process, the image-capturing devices perform automatic exposure control (hereinafter called AE control) to appropriately adjust exposure of images to be captured.

In AE control, an aperture that determines the amount of exposure of the image pickup elements, a shutter speed that determines the length of exposure time of the image pickup elements, and a gain in programmable gain amplifiers (PGAs) that amplify data read from the image pickup elements are controlled, and thus the luminance level of image data is appropriately controlled.

In AE control, the difference between a current luminance level of image data and a luminance level that is set as an appropriate value is calculated, and the aperture, the shutter speed, and the gain are controlled so that this difference is compensated for. However, especially in a case of moving images, when the luminance level of image data is rapidly compensated for, the viewability of the images is likely to be impaired in spite of the original intention. Thus, a technique has been proposed in conventional systems for causing the luminance level to smoothly converge at an appropriate value by setting a time constant on which a change in the luminance level depends. When the luminance level changes, the viewability of the images can be kept by setting the time constant. However, when a required change in the luminance level is large, the time required for the luminance level to converge at the appropriate value is long. Thus, a technique is discussed in, for example, Japanese Patent Laid-Open No. 2003-153073, in which a time constant is set so that the luminance level gradually converges at an appropriate level when the luminance of a subject changes, and the time constant is changed according to a required change in the luminance level. In this technique, when the required change in the luminance level is larger than a predetermined value, the time required to compensate for the luminance level can be shortened by decreasing the time constant.

However, even in the case where the time constant on which a change in the luminance level depends is set, when the amount of amplification of image data that is read from the image pickup elements by the PGAs is significantly changed, noise may occur in the image data depending on characteristics of the PGAs.

Moreover, when the aperture is significantly changed, noise occurs in the image data, as in the case where the amount of the gain is significantly changed, and substantial noise is produced when the aperture is changed, so that the noise is recorded when moving images are shot.

SUMMARY OF THE INVENTION

At least one exemplary embodiment is directed to exposure control of an image-capturing device (e.g., video cameras, digital still cameras, and cellular phones equipped with cameras). Control can be via variables which are set for individual devices that control exposure, where the control reduces deterioration in the quality of a captured image.

An image-capturing device according to at least one exemplary embodiment includes an imaging unit that performs photoelectric conversion on incident light that is formed on an imaging screen, a luminance-data extracting unit that extracts luminance data from data read from the imaging unit, and an exposure-adjusting unit that sets and controls an exposure value on the basis of the result of comparing the luminance data with a predetermined target luminance value for the first time and that sets control values to corresponding predetermined values on the basis of the result of comparing the luminance data with the predetermined target luminance value for the first time. The predetermined values are less than maximum values such that devices that constitute the exposure-adjusting unit can be controlled.

An image-capturing device according to at least one exemplary embodiment includes an imaging unit that performs photoelectric conversion on incident light that is formed on an imaging screen, a first exposure-controlling component, a second exposure-controlling component that includes a device different from a device included in the first exposure-controlling component, a luminance-data extracting unit that extracts luminance data from data read from the imaging unit, and an exposure-adjusting unit that sets control values of the first and second exposure-controlling components to corresponding predetermined values that are less than maximum values such that corresponding devices that constitute the first and second exposure-controlling components can be driven, and drives the first and second exposure-controlling components to adjust exposure. The control values are set on the basis of the result of comparing the luminance data with a predetermined target luminance value for the first time.

A method according to at least one exemplary embodiment configured to control an image-capturing device includes an imaging step of performing photoelectric conversion on incident light that is formed on an imaging screen, a luminance-data extracting step of extracting luminance data from data read from the imaging step, and an exposure-adjusting step of setting and controlling an exposure value on the basis of the result of comparing the luminance data with a predetermined target luminance value for the first time and of setting control values to corresponding predetermined values on the basis of the result of comparing the luminance data with the predetermined target luminance value for the first time. The predetermined values are less than maximum values such that devices that perform the exposure-adjusting step can be controlled.

A method according to at least one further exemplary embodiment configured to control an image-capturing device includes an imaging step of performing photoelectric conversion on incident light that is formed on an imaging screen, a first exposure-controlling substep, a second exposure-controlling substep that is performed by a device different from a device that performs the first exposure-controlling substep, a luminance-data extracting step of extracting luminance data from data read from the imaging step, and an exposure-adjusting step of setting control values in the first and second exposure-controlling substeps to corresponding predetermined values that are less than maximum values such that corresponding devices that perform the first and second exposure-controlling substeps can be driven, and of controlling the first and second exposure-controlling substeps to adjust exposure. The control values are set on the basis of the result of comparing the luminance data with a predetermined target luminance value for the first time.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments.

DESCRIPTION OF THE EMBODIMENTS

Figure 1:
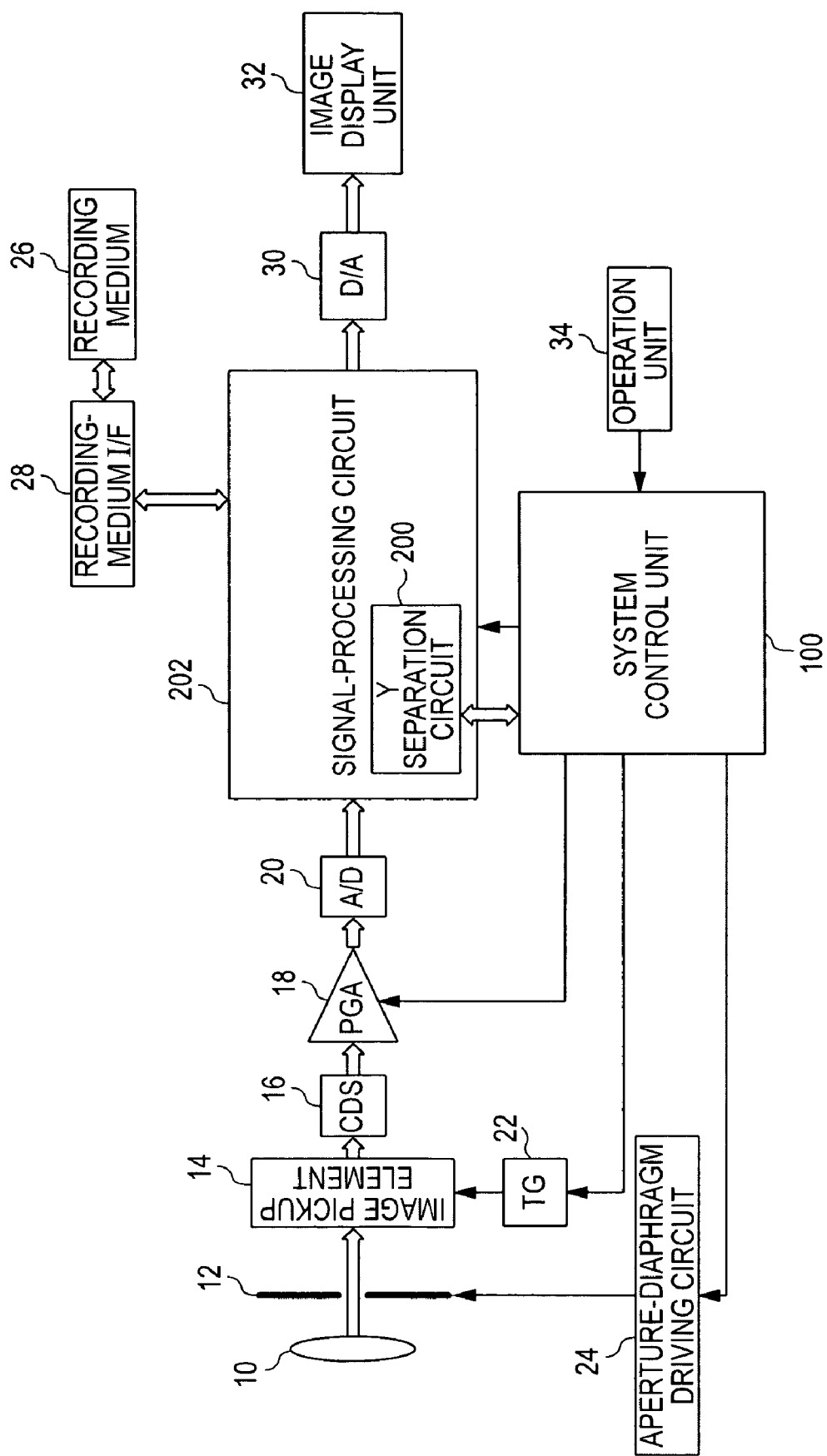
FIG. 1 illustrates a block diagram of an image-capturing device according to a first exemplary embodiment.

Exemplary embodiments will be described in detail in accordance with the accompanying drawings.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example a signal processing circuit is mentioned. The actual circuit may not be discussed in detail but such a circuit as known by one of ordinary skill is intended to be part of the enabling disclosure if appropriate.

Note that similar reference numerals and letters refer to similar items in the following figures, and thus once an item is defined in one figure, it may not be discussed for following figures.

First Exemplary Embodiment

FIG. 1 illustrates the structure of an image-capturing device according to a first exemplary embodiment.

The image-capturing device includes a lens group 10, an aperture diaphragm 12, a solid-state image pickup element 14, a correlated double sampling circuit (hereinafter called a CDS circuit) 16, a PGA 18, an analog-to-digital (A/D) converter circuit 20, a timing generator (hereinafter called TG) 22, an aperture-diaphragm driving circuit 24, a recording medium 26, a recording-medium interface (I/F) 28, a digital-to-analog (D/A) converter circuit 30, an image display unit 32, an operation unit 34, a system control unit 100, and a signal-processing circuit 202.

The lens group 10 can include a plurality of lenses, such as a zoom lens and a focus lens that gather outside light. A focus and an angle of view can be adjusted by moving the position of the focus lens and the position of the zoom lens in the lens group 10 back and forth along the optical axis (e.g., in the horizontal direction on the page of FIG. 1).

The system control unit 100 controls various types of circuits in the image-capturing device. The aperture diaphragm 12 adjusts the amount of light that passes into the image pickup element 14. The aperture-diaphragm driving circuit 24 drives the aperture diaphragm 12 on the basis of control information about the aperture diaphragm 12 sent from the system control unit 100.

An appropriate method that is suitable for the specifications of the aperture-diaphragm driving circuit 24 is adopted to send the control information from the system control unit 100 to the aperture-diaphragm driving circuit 24. For example, serial communication or pulse signals can be used.

The system control unit 100 controls the aperture diaphragm 12 and the aperture-diaphragm driving circuit 24 so as to decrease the amount of light by constricting the aperture when the subject luminance is high and increase the amount of light by dilating the aperture when the subject luminance is low.

The image pickup element 14 has a photoelectric conversion function. In this example of at least one exemplary embodiment, a CCD that is a solid-state image pickup element is used.

The image pickup element 14 is not limited to a CCD, and another image pickup element, such as a CMOS sensor, can be used as long as this image pickup element has a photoelectric conversion function.

The TG 22 controls the image pickup element 14 on the basis of information from the system control unit 100.

The TG 22 controls the exposure time of the image pickup element 14 by sending a driving signal to the image pickup element 14 at a predetermined timing for discharging electrical charge that is accumulated in the image pickup element 14.

The CDS circuit 16 reduces noise components in image data by the correlated double sampling method. Note that other methods of noise reduction can be used and the discussion herein is not intended to limit the type of noise reduction. The PGA 18 can then amplify the signal level of image data.

In general, in order to optimize the exposure of the image pickup element 14, the amount of exposure of the image pickup element 14 is appropriately set by the aperture diaphragm 12, and the exposure time of the image pickup element 14 is appropriately set by the TG 22.

Moreover, the exposure of image data can be adjusted by the PGA 18, amplifying signals of the image data.

For example, when the subject luminance is significantly low, the aperture diaphragm 12 is fully dilated so as to maximize the amount of exposure, and the exposure time of the image pickup element 14 is extended as much as possible so that the image pickup element 14 receives as much light as possible.

However, the aperture diaphragm 12 has limitations due to the mechanism, such that the aperture diaphragm 12 cannot be fully dilated for more than a predetermined period. Moreover, when the exposure time of the image pickup element 14 is extended, practical limitations exist, such that a renewal cycle of image data is extended.

In this case, the signal level of image data is low, and thus, a dark image is captured due to underexposure.

A method for overcoming this phenomenon exists, in which the PGA 18 amplifies the signal level of image data to achieve an appropriate exposure of an image.

The A/D converter circuit 20 converts analog signals of image data to digital signals.

Although the CDS circuit 16, the PGA 18, and the A/D converter circuit 20 are represented as separate circuits in the block diagram of the first exemplary embodiment, an integrated circuit (IC) package that includes these components can be adopted.

The signal-processing circuit 202 can include various types of image-processing circuits, such as a Y separation circuit 200. The Y separation circuit 200 can extract luminance data Y from image data.

Color filters of red, green, and blue, or yellow, magenta, and cyan can be disposed on the front surface of the image pickup element 14.

In this arrangement, individual pixels are subjected to filtering with individual colors, and the Y separation circuit 200 removes color data from the resulting pixel data to extract only luminance data Y.

When the Y separation circuit 200 extracts luminance data, a screen may be partitioned into a plurality of areas, and the Y separation circuit 200 can extract luminance data separately from these areas.

The process for extracting luminance data will now be described with reference to the drawings.

Figure 7:
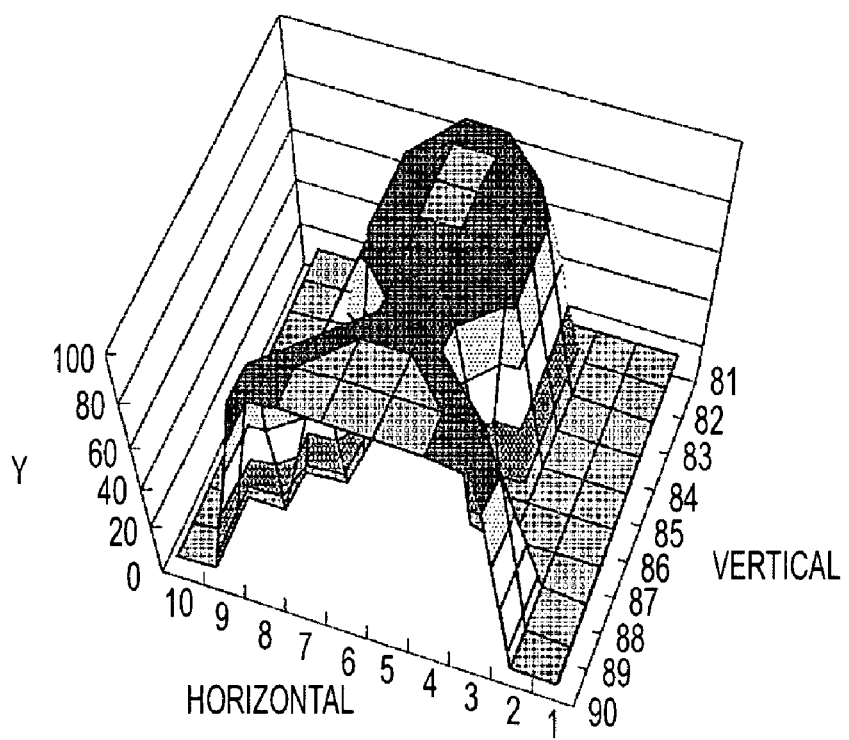
FIG. 7 illustrates a luminance distribution of image data.

FIG. 7 illustrates a luminance distribution of image data in accordance with at least one exemplary embodiment. In FIG. 7, a screen is partitioned vertically into nine strips and horizontally into ten strips, e.g., ninety areas, and the luminance distribution, in a case where a subject that includes a person having a bright color with a dark background is shot, is shown.

As is apparent from FIG. 7, the luminance level of the background is low, and the luminance level of the person is high.

Figure 8:
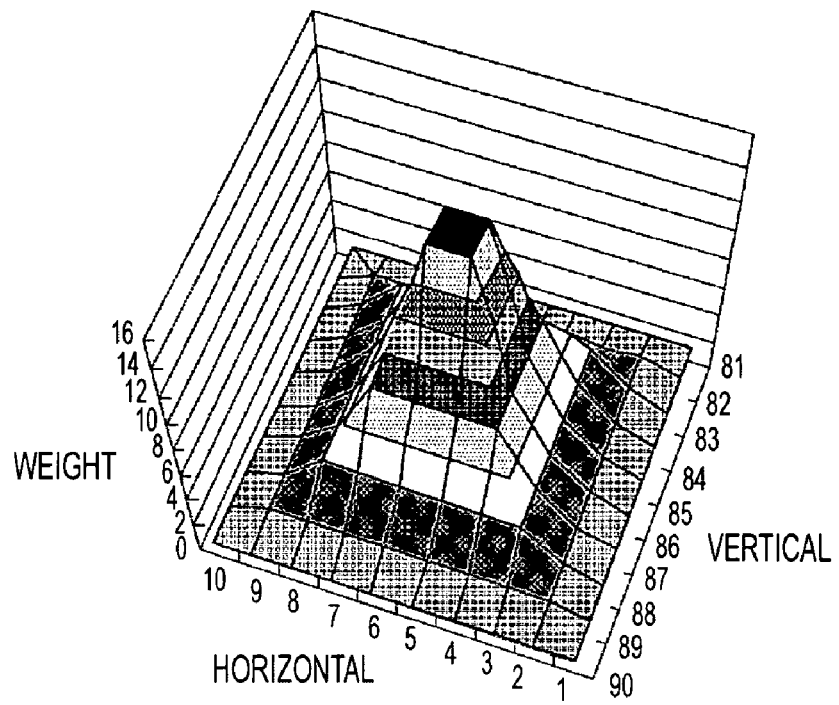
FIG. 8 illustrates a table that is used for assigning weighting factors.

FIG. 8 illustrates a three dimensional table that is used for assigning weighting factors and that be used to assign a large weighting factor to the center area of the screen. When weighting factors are assigned to the luminance distribution of the person shown in FIG. 7 on the basis of the table shown in FIG. 8, it is apparent that a large weighting factor is assigned to an area including the face of the person.

Figure 9:
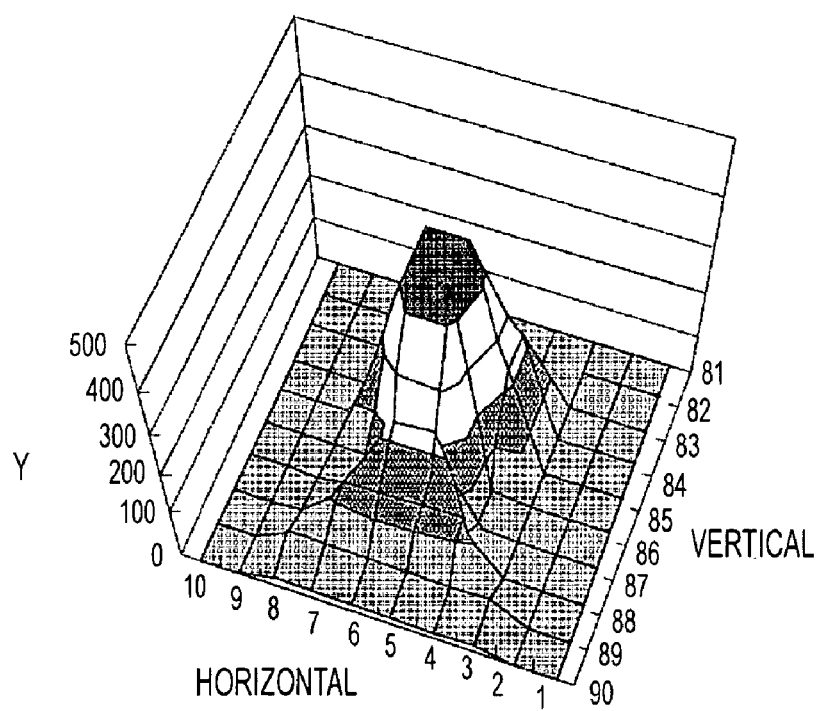
FIG. 9 illustrates a luminance distribution of image data after the weighting factors are assigned.

FIG. 9 illustrates a luminance distribution of image data after assigning weighting factors. The luminance distribution after assigning weighting factors on the basis of FIG. 8 is averaged for the entire screen, and subject luminance Y is calculated.

In FIGS. 7 to 9, the screen is partitioned vertically into nine strips and horizontally into ten strips, e.g., ninety areas. However, the arrangement and number of the partitioned areas are not limited to this case, and can be changed.

The recording medium 26 is used to record the image data, on which image processing can be performed by the signal-processing circuit 202. A nonvolatile memory, a magnetic tape, and other data recording/storage devices as known by one of ordinary skill in the relevant arts and equivalents can be used as the recording medium 26.

The recording-medium I/F 28 connects the recording medium 26 to the signal-processing circuit 202.

The recording medium 26 can be a detachable medium that can be detached from the recording-medium I/F 28.

The D/A converter circuit 30 can convert the digital image data, on which image processing is performed by the signal-processing circuit 202, to analog image data.

The image display unit 32 can display the analog image data, which is converted by the D/A converter circuit 30. For example, an LCD is used as the image display unit 32.

In the first exemplary embodiment, an image is displayed on the image display unit 32. Alternatively, an image may be output to an external monitor, such as a television, that is connected to a video output terminal of the image-capturing device with a cable.

The operation unit 34 can include a power on/off switch, an image-shooting start/stop switch, a light-metering mode selection switch, an image-shooting mode selection switch, a play-back mode selection switch, and other switches.

Figure 2:
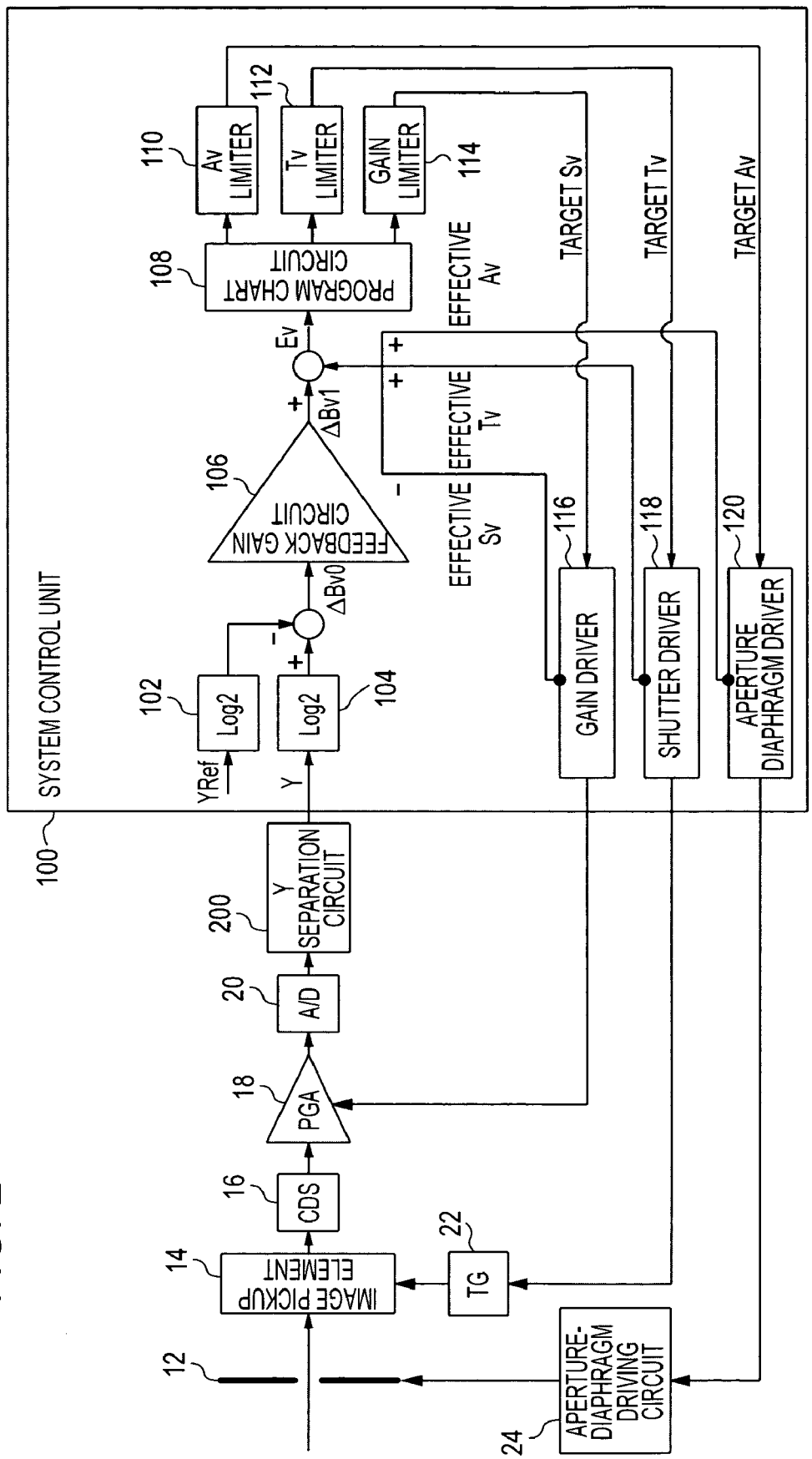
FIG. 2 illustrates a detailed block diagram of the structure of a system control unit.

FIG. 2 illustrates a detailed block diagram showing the structure of the system control unit 100, which performs AE control, in the system shown in FIG. 1.

FIG. 2 will now be described.

The system control unit 100 can include a first logarithmic compression circuit 102, a second logarithmic compression circuit 104, a feedback gain circuit 106, a program chart circuit 108, an Av limiter 110, a Tv limiter 112, a gain limiter 114, a gain driver 116, a shutter driver 118, and an aperture diaphragm driver 120.

As shown in FIG. 2, the Y separation circuit 200 can extract the luminance data Y from the image data, which is input to the system control unit 100.

The first logarithmic compression circuit 102 performs logarithmic compression on reference luminance data YRef, and the second logarithmic compression circuit 104 performs logarithmic compression on the luminance data Y.

The reference luminance data YRef compressed by the first logarithmic compression circuit 102 and the luminance data Y compressed by the second logarithmic compression circuit 104 are compared to calculate deviation $\Delta Bv0$ from the reference luminance.

In at least one exemplary embodiment, the reference luminance described above is predetermined with consideration of characteristics of the image pickup element (e.g., CCD).

Bv represents the subject luminance.

In AE control, the deviation $\Delta Bv0$ from the reference luminance can be multiplied by feedback gain in the feedback gain circuit 106 to calculate $\Delta Bv1$ so that the deviation $\Delta Bv0$ gradually converges at zero, where the deviation $\Delta Bv0$ can depend on a time constant.

The control process in the feedback gain circuit 106 will be described below.

The time constant that is referred to at this time is determined on the basis of the value of $\Delta Bv0$ and characteristics of individual devices.

FIG. 2 illustrates a simple block that performs proportional control, and the feedback gain in this case is generally set to a value less than one.

The feedback system can also include integral control, in which the deviation is integrated and the integrated value converges at zero, and can include differential control, in which feedback gain is changed according to a change from the preceding deviation to the current deviation.

An exposure value Ev is calculated on the basis of $\Delta Bv1$ and current exposure control values: an effective aperture value (hereinafter called an Av value), an effective shutter speed (hereinafter called a Tv value), and an effective sensitivity value (hereinafter called a Sv value).

The program chart circuit 108 is a circuit that refers to a program chart.

A combination of a target Av value, a target Tv value, and a target Sv value is determined on the basis of the calculated exposure value Ev and the program chart.

Figure 4:
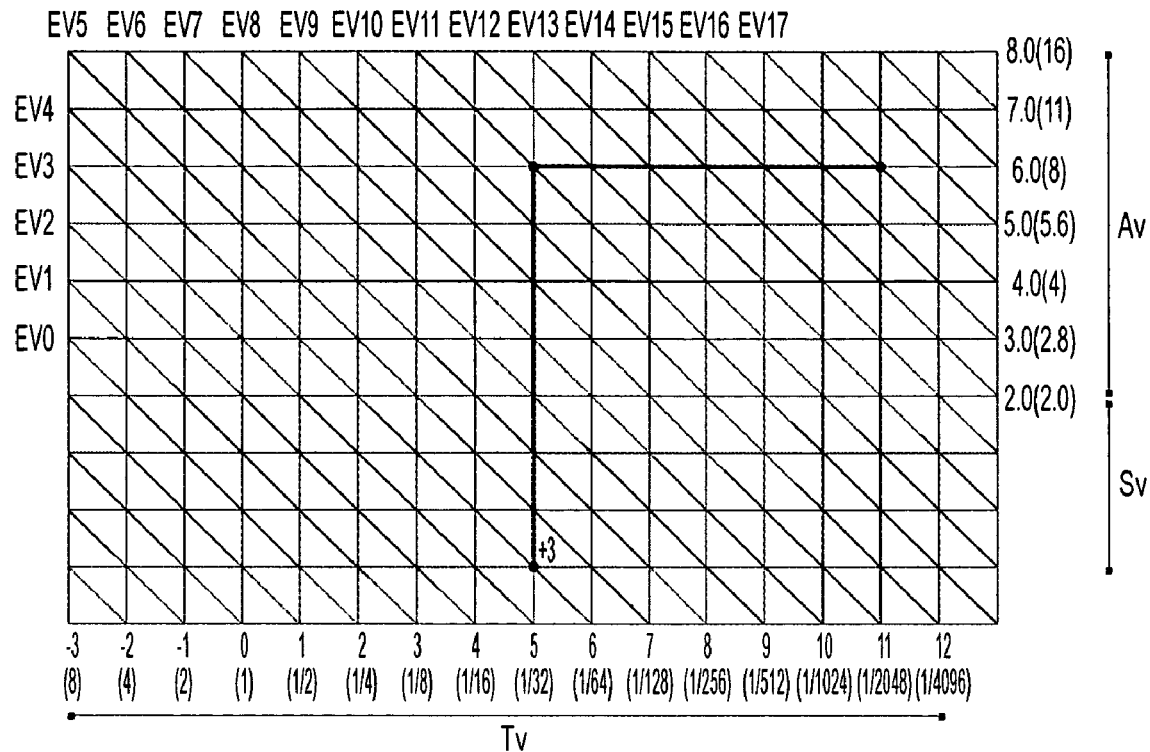
FIG. 4 illustrates a program chart.

FIG. 4 illustrates an exemplary program chart. In FIG. 4, the abscissa indicates Tv, the ordinate indicates Av and G, and oblique axes indicate Ev. The target Av value, the target Tv value, and the target Sv value can be obtained with reference to intersection points of the oblique axes and a bold line.

For example, when Ev=13, it is found that Av=6, Tv=7, and Sv=0 with reference to the intersection point of the oblique axis corresponding to this Ev value and the bold line.

Moreover, when Ev=7, it is found that Av=2, Tv=5, and Sv=2 with reference to the intersection point of the oblique axis corresponding to this Ev value and the bold line.

The gain driver 116 controls the PGA gain on the basis of the target Sv value calculated by the program chart circuit 108.

The shutter driver 118 controls the shutter speed on the basis of the target Tv value calculated by the program chart circuit 108.

The aperture diaphragm driver 120 controls the aperture on the basis of the target Av value calculated by the program chart circuit 108.

In AE control, a loop is created, in which the luminance data Y is repeatedly acquired and the deviation from the reference luminance converges at zero on the basis of the target Sv, Tv, and Av values.

Figure 6:
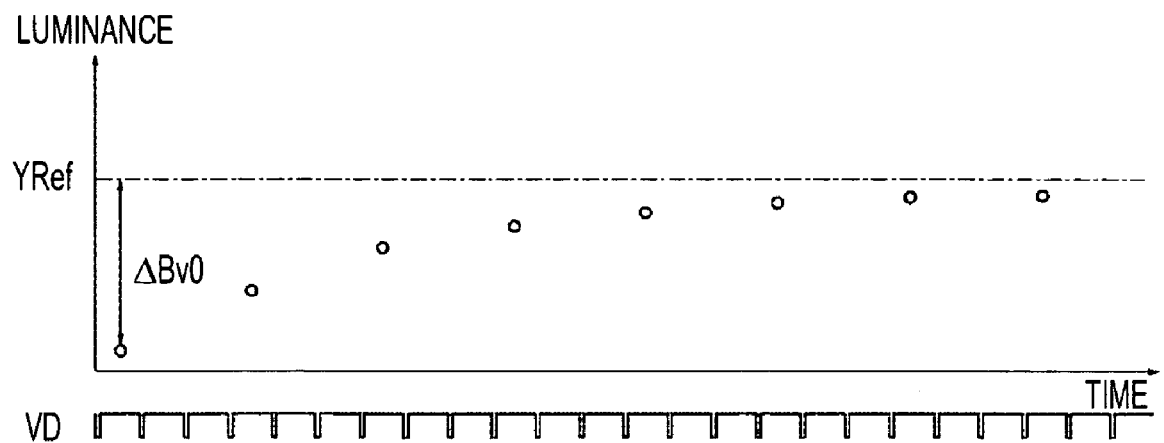
FIG. 6 illustrates the convergence process in the AE assisted by a feedback system.

FIG. 6 illustrates the convergence process of the luminance value.

In FIG. 6, as time elapses, the deviation $\Delta Bv0$ from the reference luminance YRef decreases and the luminance converges at the reference luminance YRef.

In general feedback control, the feedback gain circuit 106 of any type is used, and the deviation $\Delta Bv0$ converges at zero according to the feedback gain in the feedback gain circuit 106.

In this case, when $\Delta Bv1$ is determined, changes in the aperture, the shutter speed, and the PGA gain are not restricted.

Thus, when the value of $\Delta Bv1$ becomes high, the aperture, the shutter speed, and the PGA gain can also be changed.

For example, in the case of the PGA gain, when the PGA gain is changed, noise can occur in an image due to hardware characteristics of the PGA.

Since noise lowers the image quality, noise generation can be suppressed. Moreover, when the driving operation of the aperture diaphragm is not completed within a non-exposure period, in which electrical charge is discharged, because the driving operation takes too much time, the amount of light reflected from a subject changes during exposure. Thus, unevenness of image data occurs.

Accordingly, in at least one exemplary embodiment, appropriate exposure and satisfactory characteristics of individual devices that are factors that determine exposure are achieved by setting control limit values that are limit values of controlled variables related to the individual devices and that ensure satisfactory characteristics of the individual devices.

That is to say, in at least one exemplary embodiment, the limit values of the controlled variables are not limit values such that the devices can be controlled, but limit values of controlled variables that ensure satisfactory characteristics of the devices, e.g., controlled variables such that control processes of the devices do not lower the image quality. Thus, the limit values of the controlled variables are set so as to have values less than the limit values such that the devices can be controlled.

The Av limiter 110 restricts the controlled variable of the aperture, and the Tv limiter 112 restricts the controlled variable of the shutter speed.

The gain limiter 114 puts a limit on the amount of change in the PGA gain to reduce the amount of change in the PGA gain, thereby suppressing noise.

Furthermore in at least one exemplary embodiment, settings in which no limits are set can be selected.

Figure 3:
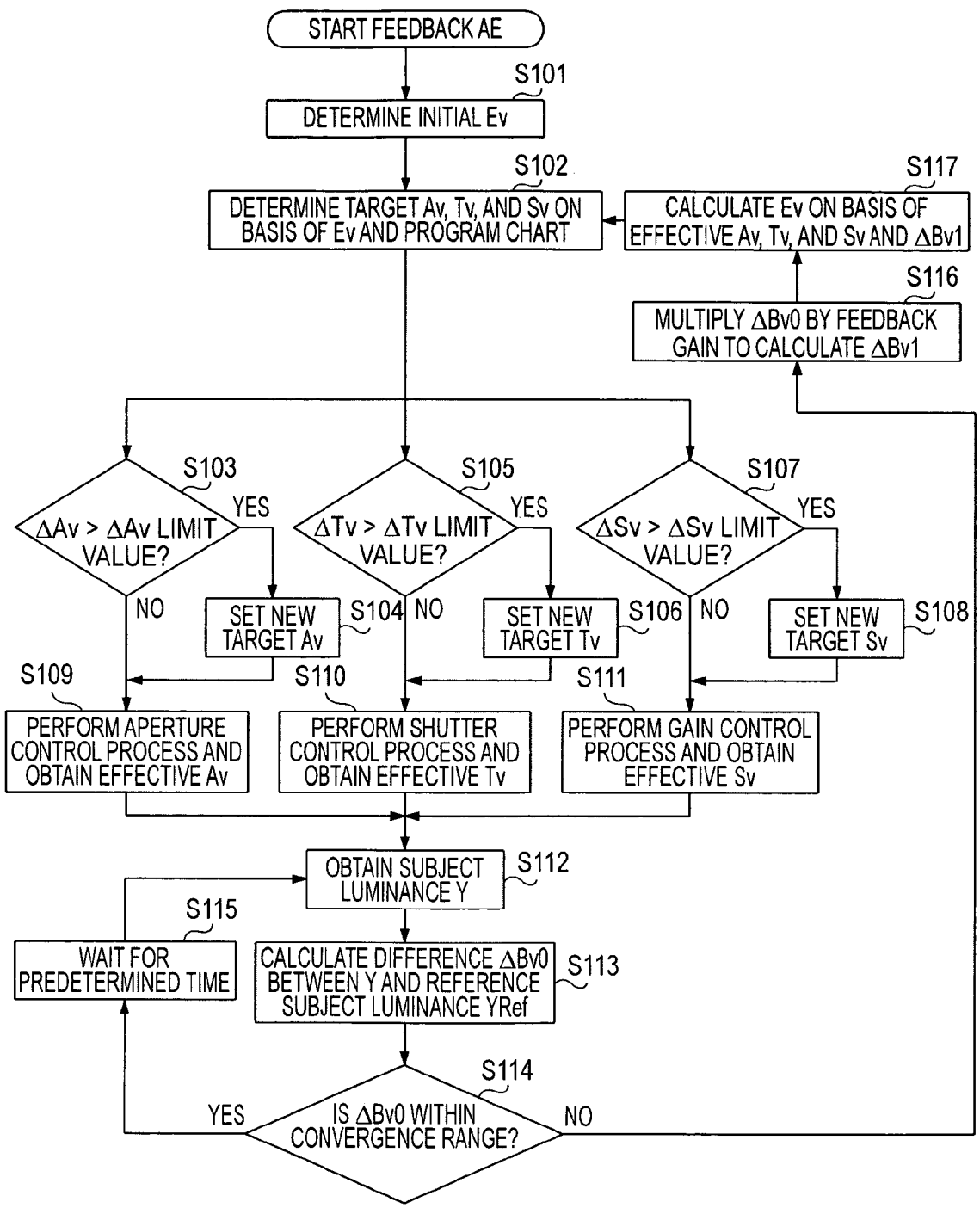
FIG. 3 illustrates a flowchart of AE process assisted by a feedback system according to the first exemplary embodiment.

The operation of AE assisted by a feedback system according to the first exemplary embodiment will now be described with reference to a flowchart of FIG. 3.

When a user turns on the power of the image-capturing device, the image-capturing device is ready to perform step S101 and succeeding steps.

In step S101, the system control unit 100 starts AE assisted by a feedback system and determines an initial Ev value on the basis of the luminance data Y obtained from image data, the reference luminance data YRef, as described above.

In step S102, the system control unit 100 determines target Av, Tv, and Sv values on the basis of the Ev value calculated in step S101 and the program chart.

In step S103, the system control unit 100 determines whether the amount of change $\Delta Av$ from the current Av value to the target Av value calculated in step S102 exceeds a $\Delta Av$ limit value.

When it is determined that the amount of change $\Delta Av$ exceeds the $\Delta Av$ limit value in step S103, the system control unit 100 proceeds to step S104.

In step S104, the Av limiter 110 sets a new target Av value such that the amount of change $\Delta Av$ is equal to the $\Delta Av$ limit value. Then, the system control unit 100 proceeds to step S109.

When it is determined that the amount of change $\Delta Av$ does not exceed the limit value in step S103, the Av limiter 110 does not change the target Av value, and the system control unit 100 proceeds to step S109.

The $\Delta Av$ limit value of the amount of change $\Delta Av$ can be freely selected.

In step S109, the aperture diaphragm driver 120 adjusts the aperture on the basis of the target Av value determined in step S103 or S104 and obtains an effective Av value after the adjustment.

In step S105, the system control unit 100 determines whether the amount of change $\Delta Tv$ from the current Tv value to the target Tv value calculated in step S102 exceeds a $\Delta Tv$ limit value.

When it is determined that the amount of change $\Delta Tv$ exceeds the $\Delta Tv$ limit value in step S105, the system control unit 100 proceeds to step S106.

In step S106, the Tv limiter 112 sets a new target Tv value such that the amount of change $\Delta Tv$ is equal to the $\Delta Tv$ limit value. Then, the system control unit 100 proceeds to step S110.

When it is determined that the amount of change $\Delta Tv$ does not exceed the $\Delta Tv$ limit value in step S105, the Tv limiter 112 does not change the target Tv value, and the system control unit 100 proceeds to step S110.

The $\Delta Tv$ limit value of the amount of change $\Delta Tv$ can be freely selected.

In step S110, the shutter driver 118 adjusts the shutter speed on the basis of the target Tv value determined in step S105 or S106 and obtains an effective Tv value after the adjustment.

In step S107, the system control unit 100 determines whether the amount of change $\Delta Sv$ from the current Sv value to the target Sv value calculated in step S102 exceeds a $\Delta Sv$ limit value.

When it is determined that the amount of change ΔSv exceeds the ΔSv limit value in step S107, the system control unit 100 proceeds to step S108.

In step S108, the gain limiter 114 sets a new target Sv value such that the amount of change ΔSv is equal to the ΔSv limit value. Then, the system control unit 100 proceeds to step S111.

When it is determined that the amount of change ΔSv does not exceed the ΔSv limit value in step S107, the gain limiter 114 does not change the target Sv value, and the system control unit 100 proceeds to step S111.

The ΔSv limit value of the amount of change ΔSv can be freely selected.

In step S111, the gain driver 116 adjusts the PGA gain on the basis of the target Sv value determined in step S107 or S108 and obtains an effective Sv value after the adjustment.

The control process of the aperture, the shutter speed, the PGA gain that is performed in steps S109 to S111 in FIG. 3 will now be described in detail with reference to FIG. 5.

A signal VD is a vertical synchronizing signal that is a type of driving signal for an image pickup element.

A signal GSUB is a signal for discharging electrical charge accumulated by an image pickup element, and a signal XSG is a signal for reading out the accumulated electrical charge.

That is to say, the period between stopping the GSUB signal and outputting a succeeding XSG signal is an exposure period, e.g., a shutter speed.

The shutter speed is controlled by controlling the output timing of the GSUB signal.

Figure 5:
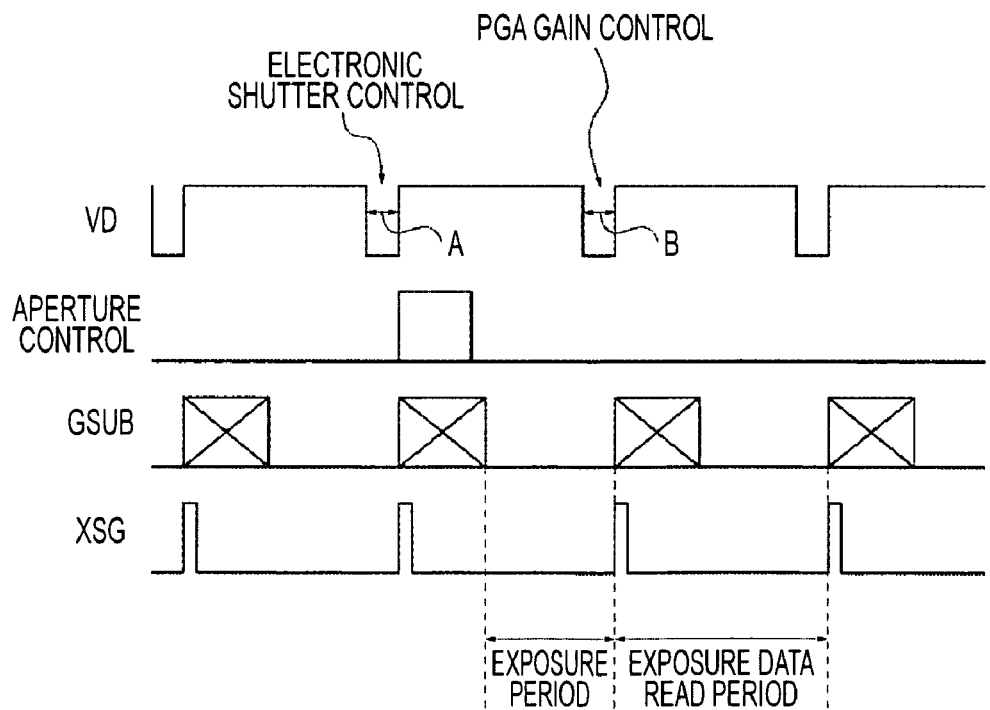
FIG. 5 illustrates control timings of aperture, shutter speed, and PGA gain.

When an instruction for changing the output timing of the GSUB signal is issued with the signal VD in a period A in FIG. 5, the change becomes effective from a succeeding GSUB signal.

The PGA gain can be used to amplify image data read from the image pickup element, and an instruction for changing the amount of amplification can be issued with the signal VD in a period B in FIG. 5.

In this way, the change in the amount of amplification becomes effective when data accumulated during an exposure period is read in an exposure data read period, as shown in FIG. 5.

As described above, electrical charge is discharged during a period in which the signal GSUB is output, e.g., a period in which exposure is not performed.

When aperture control is also performed during this period, luminance flicker that occurs when the aperture diaphragm is driven can be reduced from being captured.

In step S112, the signal-processing circuit 202 calculates the subject luminance Y on the basis of the target Av, Tv, and Sv values obtained in steps S109 to S111.

In step S113, the signal-processing circuit 202 calculates the deviation ΔBv0 of the subject luminance Y calculated in step S112 from the reference subject luminance YRef.

In step S114, the system control unit 100 determines whether the deviation ΔBv0 calculated in step S113 falls within a convergence range.

The convergence range can be fixed or can vary according to the circumstances.

For example, regarding a shutter, a phenomenon may be observed, in which control resolution decreases as the shutter speed becomes higher, depending on characteristics of an aperture diaphragm, the shutter, and PGA gain. In this case, the convergence range can be extended as control resolution decreases.

When the deviation ΔBv0 falls within the convergence range, the current exposure control value is substantially appropriate and need not be changed any more at this time.

Thus, the system control unit 100 waits for a predetermined time in step S115 and then repeats steps S112 to S114.

When the deviation ΔBv0 does not fall within the convergence range, the feedback gain circuit 106 multiplies the deviation ΔBv0 by feedback gain to calculate ΔBv1 in step S116.

In step S117, the system control unit 100 calculates the exposure value Ev on the basis of the current effective Av, Tv, and Sv values and ΔBv1 and then repeats step S102 and succeeding steps. That is to say, even when the deviation of the luminance data of image data from the reference luminance data does not decrease to zero in one cycle of steps S102 to S112, the luminance data of image data is recalculated, and step S102 and succeeding steps are performed on the basis of the recalculated luminance data. Thus, even when the subject moves during the process including steps S102 to S112 and the luminance data changes, this change in the luminance data can be followed quickly.

As described above, in this exemplary embodiment, when AE control is performed, changes in individual variables (an aperture, a shutter speed, and a PGA gain) related to devices that control exposure are restricted regardless of the magnitude of the deviation of luminance data of image data from reference luminance data. That is to say, changes in individual variables related to devices that control exposure are restricted in one cycle in which the deviation of luminance data of image data from reference luminance data is calculated. Thus, when the deviation of luminance data of image data from reference luminance data is large, the deviation does not decrease to zero in one feedback cycle. In this exemplary embodiment, AE control that ensures satisfactory characteristics of devices that control exposure can be performed in the manner described above.

Needless to say, the exemplary embodiment is also implemented by providing to a system or an apparatus a storage medium (or a recording medium) that stores program codes of software that perform the functions according to the exemplary embodiment described above and by causing a computer (a CPU or an MPU) included in the system or in the apparatus to read and execute the program codes stored in the storage medium.

In this case, the program codes read from the storage medium can perform the functions according to the exemplary embodiment described above, and thus at least one exemplary embodiment includes the storage medium, which stores the program codes.

Moreover, the functions according to the exemplary embodiment described above are performed by executing the program codes read by the computer.

Moreover, an operating system (OS) operating on a computer may execute some or all of the actual processing to perform the functions of the exemplary embodiment described above according to instructions from the program codes.

Moreover, the program codes read from the storage medium can be written to a memory included in, for example, a function expansion card inserted in a computer or a function expansion unit connected to a computer. Then, for example, a CPU included in the function expansion card or the function expansion unit can execute some or all of the actual processing to perform the functions of the exemplary embodiment described above according to instructions from the program codes.

When at least one exemplary embodiment is applied to the storage medium described above, the storage medium stores the program codes corresponding to the flowchart described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-358359 filed Dec. 10, 2004, which is hereby incorporated by reference herein in its entirety.

What is claimed is:

1. An image-capturing device comprising:
   an imaging unit that is configured to perform photoelectric conversion on incident light that is formed on an imaging screen;
   a first exposure-controlling component;
   a second exposure-controlling component that includes a device different from a device included in the first exposure-controlling component;
   a luminance-data extracting unit that extracts luminance data from data read from the imaging unit; and
   an exposure-adjusting unit that sets control values of the first and second exposure-controlling components to corresponding predetermined values that are less than respective maximum values such that corresponding devices that constitute the first and second exposure-controlling components can be driven, and drives the first and second exposure-controlling components to adjust exposure,
   wherein the control values are set on the basis of comparing the luminance data with a predetermined target luminance value for a first time, and
   wherein, when it is determined that the control value of the first exposure-controlling component exceeds the corresponding predetermined value, the exposure-adjusting unit adjusts the control value of the first exposure-controlling component to a value that is equal to or less than the corresponding predetermined value, then the exposure-adjusting unit sets the control value of the first exposure-controlling component again on the basis of the result of comparing luminance data that is obtained after the adjustment described above and the predetermined target luminance value.

2. The image-capturing device according to claim 1, wherein, when it is determined that the control value of the second exposure-controlling component exceeds the corresponding predetermined value, the exposure-adjusting unit adjusts the control value of the second exposure-controlling component to a value that is equal to or less than the corresponding predetermined value, then the exposure-adjusting unit sets the control value of the second exposure-controlling component again on the basis of the result of comparing luminance data that is obtained after the adjustment described above and the predetermined target luminance value.

3. A method for controlling an image-capturing device comprising:
   an imaging step of performing photoelectric conversion on incident light that is formed on an imaging screen;
   a first exposure-controlling substep;
   a second exposure-controlling substep that is performed by a device different from a device that performs the first exposure-controlling substep;
   a luminance-data extracting step of extracting luminance data from data read from the imaging step; and
   an exposure-adjusting step of setting control values in the first and second exposure-controlling substeps to corresponding predetermined values that are less than respective maximum values such that corresponding devices that perform the first and second exposure-controlling substeps can be driven, and of driving the first and second exposure-controlling substeps to adjust exposure,
   wherein the control values are set on the basis of the result of comparing the luminance data with a predetermined target luminance value for a first time, and
   wherein, when it is determined that the control value in the first exposure-controlling substep exceeds the corresponding predetermined value, the exposure-adjusting step adjusts the control value in the first exposure-controlling substep to a value that is equal to or less than the corresponding predetermined value, then the exposure-adjusting step sets the control value in the first exposure-controlling substep again on the basis of the result of comparing luminance data that is obtained after the adjustment described above and the predetermined target luminance value.

4. The method for controlling an image-capturing device according to claim 3, wherein, when it is determined that the control value in the second exposure-controlling substep exceeds the corresponding predetermined value, the exposure-adjusting step adjusts the control value in the second exposure-controlling substep to a value that is equal to or less than the corresponding predetermined value, then the exposure-adjusting step sets the control value in the second exposure-controlling substep again on the basis of the result of comparing luminance data that is obtained after the adjustment described above and the predetermined target luminance value.

5. A computer-readable storage medium that stores a computer-executable program for controlling an image-capturing device, the computer-executable program comprising:
   program code for implementing an imaging step of performing photoelectric conversion on incident light that is formed on an imaging screen;
   program code for implementing a first exposure-controlling substep;
   program code for implementing a second exposure-controlling substep that is performed by a device different from a device that performs the first exposure-controlling substep;
   program code for implementing a luminance-data extracting step of extracting luminance data from data read from the imaging step; and
   program code for implementing an exposure-adjusting step of setting control values in the first and second exposure-controlling substeps to corresponding predetermined values that are less than respective maximum values such that corresponding devices that perform the first and second exposure-controlling substeps can be driven, and of driving the first and second exposure-controlling substeps to adjust exposure,
   wherein the control values are set on the basis of the result of comparing the luminance data with a predetermined target luminance value for a first time, and
   wherein, when it is determined that the control value in the first exposure-controlling substep exceeds the corresponding predetermined value, the exposure-adjusting step adjusts the control value in the first exposure-controlling substep to a value that is equal to or less than the corresponding predetermined value, then the exposure-adjusting step sets the control value in the first exposure-controlling substep again on the basis of the result of comparing luminance data that is obtained after the adjustment described above and the predetermined target luminance value.

6. The computer-readable storage medium that stores a computer-executable program for controlling an image-capturing device according to claim 5, wherein, when it is determined that the control value in the second exposure-controlling substep exceeds the corresponding predetermined value, the exposure-adjusting step adjusts the control value in the second exposure-controlling substep to a value that is equal to or less than the corresponding predetermined value, then the exposure-adjusting step sets the control value in the second exposure-controlling substep again on the basis of the result of comparing luminance data that is obtained after the adjustment described above and the predetermined target luminance value.

* * * * *